United States Patent [19]

Jacaruso et al.

[11] 4,148,322

[45] Apr. 10, 1979

[54] LAMINATE PRODUCTS SUITABLE FOR MAKING MOLDED BRA CUPS

[75] Inventors: Salvatore Jacaruso, Maspeth; Joseph A. Giuliano, Oyster Bay, both of N.Y.

[73] Assignee: ACAR Laminators Corp., Brooklyn, N.Y.

[21] Appl. No.: 876,387

[22] Filed: Feb. 9, 1978

Related U.S. Application Data

[63] Continuation-in-part of Ser. No. 702,907, Jul. 6, 1976, Pat. No. 4,090,900.

[51] Int. Cl.² .............................................. A41C 3/00
[52] U.S. Cl. .................................... 128/464; 128/481; 156/85; 156/245; 264/324; 428/236; 428/246; 428/253; 428/284; 428/287; 428/298; 428/302
[58] Field of Search ............... 428/236, 246, 252, 247, 428/282, 284, 287, 298, 302, 303; 156/85, 245; 264/112, 324, 257; 128/290 R, 461, 462, 463, 464, 481

[56] References Cited

U.S. PATENT DOCUMENTS

| | | | |
|---|---|---|---|
| 3,239,586 | 3/1966 | Adams | 264/324 |
| 3,320,346 | 5/1967 | Galitzki et al. | 264/324 |
| 3,348,549 | 10/1967 | Brodmann et al. | 264/324 |
| 3,570,085 | 3/1971 | Heinemann | 156/85 |
| 3,799,174 | 3/1974 | Howard | 156/245 |
| 4,013,750 | 3/1977 | Magidson et al. | 264/324 |

*Primary Examiner*—James J. Bell
*Attorney, Agent, or Firm*—Raymond P. Niro

[57] ABSTRACT

Laminate sheet materials having outer fabric layers and an intermediate non-woven fiberfill layer are provided, which are particularly suitable for use in making molded, one-piece, bra cups. The sheet materials are uniformly pre-shrunk, and include fabric outer layers that are securely rather than lightly bonded to an intermediate fiberfill layer by amounts of adhesive that substantially penetrate the intermediate layer.

8 Claims, 3 Drawing Figures

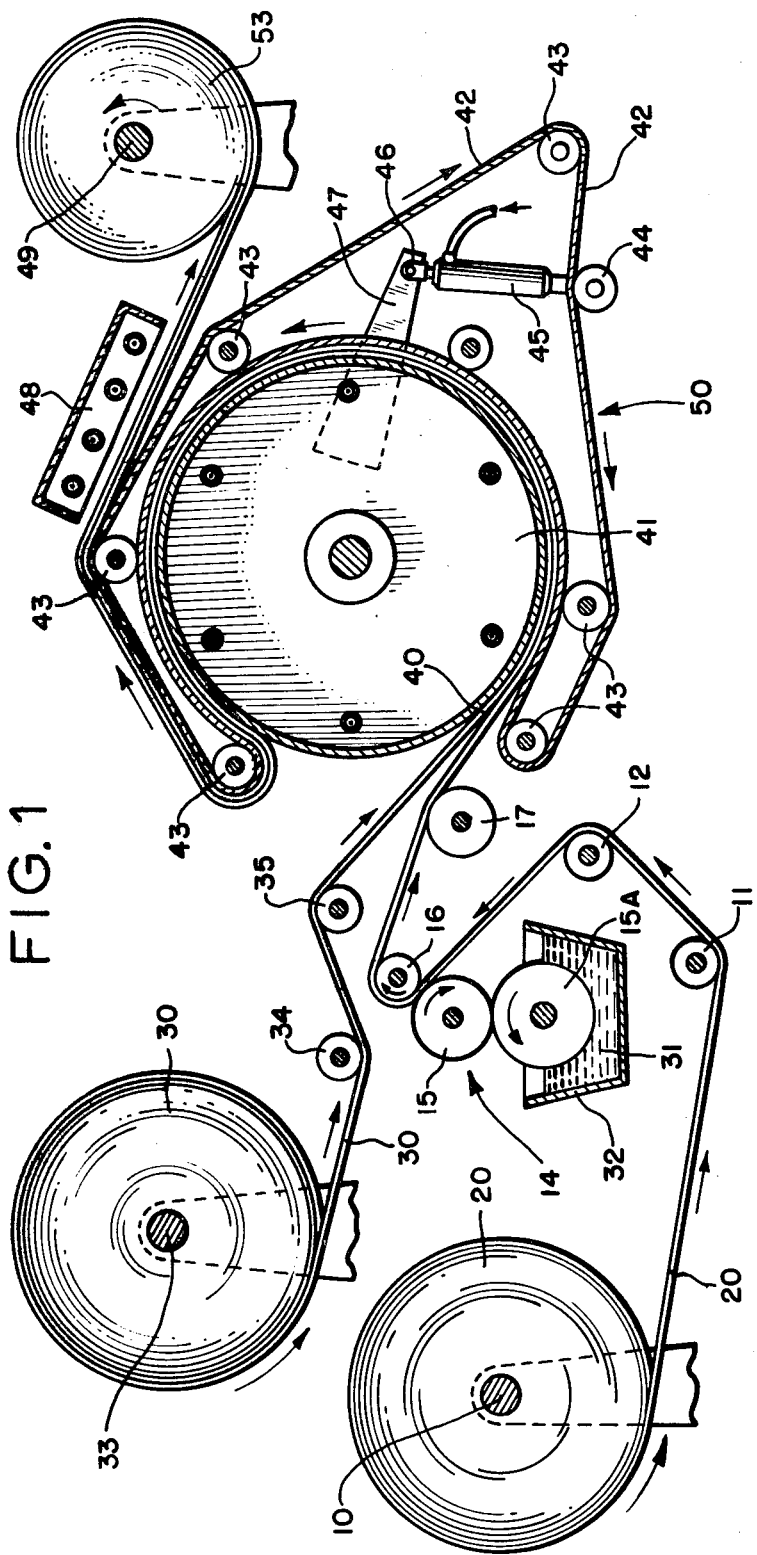
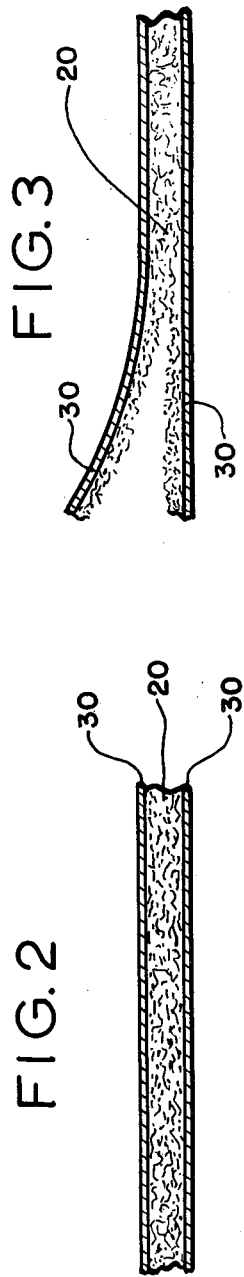

LAMINATE PRODUCTS SUITABLE FOR MAKING MOLDED BRA CUPS

RELATED APPLICATION

This application is a continuation-in-part of application Ser. No. 702,907, filed July 6, 1976, now U.S. Pat. No. 4,090,900.

BACKGROUND AND SUMMARY OF THE INVENTION

This invention relates to laminated sheet materials, and to specific laminate materials which have been found to be particularly useful in making molded, one-piece, non-stitched bra cups.

At present, the bra cup portion of brassieres, as they are currently manufactured, are made in a multi-step process that requires, among other things, that two or more pieces of laminated fabric be separately molded, sewn together to form a completed bra cup, and then integrated into a finished brassiere. Such a manufacturing technique involves a considerable amount of manual sewing and cutting by skilled personnel; it requires the purchase and use of expensive equipment such as sewing machines; and it requires excessive handling of individual piece goods as they are cut and fabricated into a finished bra cup. Perhaps even more importantly, however, the repeated cutting and sewing required to fabricate bra cups from separate half pieces greatly increases the opportunity for manufacturing error, by introduction of the human variable of sewing, and often times results in poorly fitting bra cups that must be altered through adjustment of straps and accessories. In addition, the seams which appear across the center portion of bra cups made by such currently used brassiere manufacturing techniques are less comfortable for wearers, less aesthetically pleasing because the seams tend to show through some blouses and sweaters as ridges, and thus, far less useful for a variety of fashion end uses than one-piece molded bra cups.

A one-piece molded bra cup, therefore, would not only eliminate many of the comfort and aesthetic problems for wearers, but would greatly reduce brassiere manufacturing costs by eliminating both the need for additional manufacturing personnel to cut and sew separate half-pieces of fabric together and the need for additional sewing and cutting equipment to carry out the bra cup manufacture. As a consequence of the many advantages which result from the use of a one-piece molded bra cup (instead of the conventional two-piece approach), considerable interest has developed in the manufacture of laminate materials which are capable of being efficiently and effectively molded into a one-piece bra cup. Although processes have been attempted to manufacture laminate materials suitable for one-piece molding, none has proved entirely successful. In part, this has happened because of insufficient bonding between the laminate layers and because of the inability of the resulting laminate materials to meet the very stringent commercial requirements for bra cups, such as permanence of form, washability, strength, durability, softness, flexibility, smoothness of inner surfaces, and perhaps most importantly, the absence of wrinkling, fabric slippage and decorative pattern distortion.

SUMMARY OF THE INVENTION

The laminate materials of the present invention have overcome the various above-described problems associated with prior art laminate compositions, and, as a consequence, are particularly well suited for use in making molded one-piece bra cups that can meet the stringent commercial criteria for bra cups and brassieres.

The present invention involves unique multi-layered laminate sheets, which have been demonstrated to be particularly suitable for use in making molded one-piece bra cups for brassieres. Preferably, the uniformly pre-shrunk, laminated sheet, and thus the completed bra cup as well, has a three layer construction, the top and bottom outer layers preferably being constructed from woven fabric or lace-like materials made from polyester or related type fibers, while the center or intermediate layer is preferably constructed from a non-woven fiberfill type material of bonded polyester or related fibers. The materials used for the outer and intermediate layers are desirably compatible with one another and have identical or similar forming and shrinking characteristics during molding or the application of uniform heat and pressure.

The laminate sheets of the present invention are made by a process in which an adhesive is applied to the center fiberfill layer in two passes, a first pass in which one of the outer fabric layers is bonded to one side of the fiberfill layer, and then dried and partially shrunk through the application of heat and uniform pressure, and a second pass in which the other outer fabric layer is bonded in the same manner to the opposite side of the fiberfill layer and similarly dried and partially shrunk. It should be understood, of course, that the laminate sheets could also be made in a single pass merely by applying suitable adhesive to both sides of the fiberfill layer simultaneously.

Unlike prior art laminates, sufficient adhesive is applied to the intermediate fiberfill layer to insure a strong secure bond between it and the outer fabric layers. Preferably, adhesive is applied to the fiberfill layer by a reverse roll which is rotated in a direction opposite to the direction that the fiberfill layer itself is moving. This reverse direction application of adhesive results in a deep penetration of adhesive material into the fiberfill layer, insures the formation of a desirably strong, secure bond between the outer and fiberfill layers, and promotes uniform shrinkage of the outer and intermediate fiberfill layers during subsequent molding operations, all of which enhance the resultant properties of the finished laminate sheet and make it highly desirable for use in making molded one-piece bra cups.

After reverse application of adhesive, the coated side of the fiberfill layer is brought into contact with one of the outer fabric layers, and pressed against a rotating heated drum by a moving blanket which applies a uniform and constant pressure to the two layers. This continuous and uniform application of heat and pressure also serves to enhance the properties of the resultant laminate sheet by increasing the penetration of the adhesive into the fiberfill layer and by insuring a controlled uniform shrinkage of the laminate material.

Thus, through proper selection of shrink compatible fabric and fiberfill materials, the use of a reverse application and deep penetration of adhesive, and the application of uniform and constant heat and pressure after the application of adhesive, a controlled pre-shrinkage of the resultant laminate sheet occurs before the sheet is heat and pressure molded into finished one-piece bra cups. During subsequent heat and pressure molding, therefore, the laminate materials of this invention do not experience non-uniform shrinkage between layers, do not warp or wrinkle, and do not have the many undesired properties that make other laminate materials ill-suited for use in making molded one-piece bra cups.

DESCRIPTION OF THE DRAWINGS

FIG. 1 is a schematic view of one embodiment of a process for making the laminate compositions of this invention, illustrating the manner in which one of the outer fabric layers of the finished laminate products is bonded to an intermediate fiberfill layer of material;

FIG. 2 is an enlarged end view of a pre-shrunk finished three-ply laminate material, suitable for use in making one-piece molded bra cups, having a non-woven fiberfill intermediate layer disposed between and securely bonded to two separate fabric outer layers; and FIG. 3 is an end view of one embodiment of the pre-shrunk three-ply laminate material of this invention, which illustrates the high degree of bonding which exists between the outer and intermediate layers of material, as the outer layers are pulled apart.

DESCRIPTION OF THE PREFERRED EMBODIMENT

Referring now to the drawings, which illustrate one embodiment of the process and resultant laminate products of this invention, FIG. 1 shows the general arrangement and operative relation of various component parts of a modified laminating apparatus useful in the practice of this invention.

In the practice of the illustrated embodiment of the present invention, a roll of non-woven fiberfill material 20 (the intermediate layer in the resultant laminate sheet), after being properly stabilized by roll 11, is passed from supply roll 10 around an adjustable roll 12, which adjusts and insures that a proper feeding angle exists and that tension is applied to the fiberfill layer 20 as it is passed into the adhesive application area, sufficient adhesive is applied to the fiberfill layer 20 to insure a strong, secure bond between it and the outer fabric layer 30. This is at least in part accomplished through the action of reverse roll 15, which as indicated by the arrows, is rotated in a clockwise direction opposite to the direction of movement of fiberfill layer 20.

Unlike various prior art laminate structures, such as that described in U.S. Pat. No. 3,799,174, adhesive material 31 is applied to the intermediate fiberfill layer 20 in such a manner to insure substantial penetration of adhesive into the fiberfill layer, e.g., to levels between about $\frac{1}{3}$ to $\frac{1}{2}$ the overall thickness of the fiberfill layer on each side of the fiberfill layer after final application of heat and pressure to the laminate. A surface bonding agent which is capable of only lightly bonding the fiberfill and outer fabric layers is not sufficient to provide adequate bonding, and indeed is undesirable. Moreover, as shown in FIG. 3, the outer layers 30 are more than just tacked to the fiberfill layer 20, since as the outer layers 30 are pulled apart, substantial amounts of fiberfill material are secured to the outer layers.

Adhesive material 31, contained in trough 32, is removed by a partially immersed rotating transfer roll 15A, and is applied first to reverse roll 15, and then in a continuous manner to the moving fiberfill layer 20. The reverse action of roll 15 and fiberfill layer 20 results in a deep penetration of adhesive into the continuously moving fiberfill layer and greatly enhances the resultant properties of the finished laminate sheet. Preferably, the speed of rotation of reverse roll 15 is regulated so that the appropriate quantity and degree of penetration of adhesive material 31 can be appropriately adjusted for various types of fiberfill material, as set forth in greater detail in the Example given below.

After application of the adhesive, the coated fiberfill layer is passed around a feeder roll 16, which adjusts the degree of tension applied to the fiberfill layer 20. From feeder roll 16, the coated and partially impregnated fiberfill layer moves across spreader roll 17, which stretches and elongates the fiberfill to increase its surface area immediately prior to its initial point of contact 40 with outer fabric layer 30.

The outer fabric layer 30 in turn is removed from supply roll 33 and passes across two bars 34 and 35, the latter of which is slightly bowed so as to maintain a smooth and taut surface for the fabric layer 30 immediately prior to its initial point of contact 40 with the treated fiberfill layer 20.

The heating and curing area of the illustrated embodiment indicated generally as 50, accomplishes two objectives in the laminating process; it first serves to securely bond the outer fabric layer 30 to the coated fiberfill layer 20, and secondly serves to uniformly and partially pre-shrink the resultant laminate material. This heating and curng area 50 is preferably made up of a heated rotating drum 41 and a superimposed endless blanket 42, which surrounds and engages the major portion of drum 41. A series of rolls 43 are spaced about and rotatably support endless blanket 42 as it rotates about the outer circumference of drum 41. The rollers 43 maintain blanket 42 in spaced, circumferential relationship with drum 41 so that blanket 42 can apply a uniform and constant pressure to the treated fiberfill layer 20 and fabric layer 30 as they come into contact around rotating drum 41 and insure the proper amount of final penetration of adhesive into the fiberfill layer.

The uniform pressure is applied by a piston 45, which is attached at one end to roll 44 and at its other end 46 to the frame 47 of the laminating apparatus. During operation, piston 45 is securely locked into position on frame 47 to maintain a constant and uniform pressure on endless blanket 42, and thus, on the contacting outer fabric layer 30 and intermediate fiberfill layer 20 as they pass between blanket 42 and heated drum 41.

After the contacting outer fabric layer 30 and fiberfill layer 20 travel across the circumference (approximately 4/5ths the circumference) of heated drum 41, they are passed beneath heater 48, which acts to further dry, cure and shrink the laminated layers, and then are collected on take-up roll 49. In order to complete the entire laminating process and make a three-layered structure, the two laminated layers, indicated as 53, are removed from take-up roll 49, placed on roll 10, and reprocessed in a second pass through the process so that a second outer layer 30 can be similarly bonded to the other (non-bonded) side of fiberfill layer 20.

Therefore, the resultant laminate sheet, shown generally in FIG. 2, comprises two outer fabric layers 30 which are securely bonded to a non-woven, intermediate fiberfill layer 20. Preferably, outer fabric layers 30 and intermediate fiberfill layer 20 are made from compatible fiber materials which have similar or identical shrink properties when subjected to heat and pressure. Although a variety of materials can be used for the fabric layers 30 and fiberfill layer 20, provided they are compatible, polyester fibers have been found to be particularly suitable for use in the present invention. In particular, woven polyester fibers, such as "Dacron"

polyester or "Qiana" polyester, as well as laces and woven polyester-cotton mixtures having deniers in the range of 20 to 70 have been found to be particularly suitable for use as the outer fabric layers. The intermediate fiberfill layer, on the other hand, is desirably made of random, garnet (fibers oriented in one direction) or isomisor (fibers oriented in -x and -y directions) nonwoven fibers, preferably polyester staple fibers of the conventional drawn or oriented type employed in the textile industry, and having a length in the range of one to two inches, or unplasticized polyester staple fibers of the undrawn or amorphous type, also having a length in the range of one to two inches. The adhesive materials found particularly useful in the practice of this invention are aqueous dispersions or emulsions of carboxylic acrylate polymers, including cross-linked synthetic polyacrylic aqueous emulsions, having a shipped viscosity of about 7,500 cps, a density of about 8.8 pounds/gallon, a pH of about 6.7, a total solids content of about 44.5 percent by weight and a cure time of approximately three minutes at 290° F. It should be understood, of course, that adhesive materials and outer fabric and intermediate, non-woven fiberfill materials other than those discussed herein would be suitable for use in the practice of the present invention, the polyester fibers and polyacrylate adhesives merely being more desirable than other compositions.

It has been determined that the properties of the partially pre-shrunk laminate products of this invention are particularly well suited for making molded, one-piece bra cups. For example, the laminate products of this invention are porous and breathable so as to permit the passage of air and moisture; they do not abrade skin; and after molding they have sufficient body, strength and resilience to hold their shape, even after repeated washing. Perhaps even more significant, the laminate products of this invention can be readily heat and pressure molded without wrinkling or distorting, and because of the controlled pre-shrink which occurs during processing, without excessive, non-uniform shrinking between individual laminate layers.

Although it is generally preferred that adhesive be applied to the fiberfill layer during processing, it is sometimes more desirable for some fabrics to reverse the positions of the outer fabric and fiberfill layers so that adhesive is applied to the outer fabric layers instead of the fiberfill layer. The amount of adhesive applied to either the fiberfill or outer layers is adjusted by means of the speed of reverse roll 15. Typically, sufficient adhesive is applied to create a strong, secure bond between the outer fabric and intermediate fiberfill layers. As shown in FIG. 3, sufficient adhesive is considered applied when about ⅓ to ½ the overall thickness of the fiberfill layer on each side of the fiberfill layer is penetrated by adhesive, and the outer layers of the finished laminate cannot be torn apart without a considerable amount of the fiberfill layer remaining attached to each of the outer fabric layers. Such a strong, secure bond between the outer fabric layers and intermediate fiberfill layer prevents a total shift between the outer layers during molding, which has been found to have an undesirable effect on the resultant properties of the molded bra cup.

During the application of heat and uniform pressure to the contacting fabric and fiberfill layers as they pass around rotating drum 41, temperatures in the range of about 175° F. to 330° F. have been found to be suitable to adequately cure and pre-shrink the fabric materials useful in the practice of this invention. Temperatures in the range of about 230° F. to 240° F., for example, are particularly suitable for the polyester fibers and polyacrylic adhesives used in the practice of the present invention. The exact temperature ranges selected for any given combination of outer fabric and intermediate fiberfill layers is typically below that point at which the fiber memory is broken, although it is possible that for some fibers, temperatures above that required to break the fiber memory can be used.

Sufficient pressure is applied by the endless blanket 42 to insure the formation of a firm bond between the fabric and fiberfill layers, as well as adequate penetration of adhesive into the fiberfill layer, and is best determined for any given fabric combination through empirical techniques, i.e., pressures sufficient to maintain the fabric and fiberfill layers in firm contact so that after curing the outer fabric layers cannot be torn apart without removing significant portions of attached fiberfill as shown in FIG. 3.

Although there are many advantages to the present invention, the most meaningful advantage is that it can be used to continuously make laminate sheets that are especially suited for molding one-piece bra cups. It is believed that these advantageous properties are imparted to the finished laminate sheets because of the action of the variable speed reverse roll which drives adhesive into the fiberfill layer, thus insuring a strong bond, and because of the constant and uniform application of heat and pressure to the laminate layers as adhesive further penetrates the fiberfill layer and is being cured. In this way, the finished three-layered laminate is partially pre-shrunk in a uniform fashion, and is thus not susceptible to the many problems associated with rapid, non-uniform shrinking during subsequent molding operations.

EXAMPLE

Four separate rolls of laminate sheets were made in the manner and with the apparatus described in greater detail above, in which the speed of rotation of reverse roll 15 was varied to vary the amount and the degree of penetration of adhesive applied to the intermediate fiberfill layer 20. In each case, one outer fabric layer material was 40 denier polyester and the other outer layer 20 denier polyester, while the intermediate fiberfill layer was polyester staple fibers, random web, 2.9 ounces per yard. The same adhesive was used to make each sample, and each sample roll of laminate was numbered from 1 to 4.

| Sample No. | Amount of Adhesive |
|---|---|
| 1 | 50 percent less than control |
| 2 | 25 percent less than control |
| 3 | Control |
| 4 | 25 percent more than control |

The amount of adhesive used in control sample 3 was determined by adjusting the speed of reverse roll 15 to insure penetration of adhesive after application of heat and pressure to approximately ½ the overall thickness of intermediate layer 20. The speed of reverse roll 15 was thereafter adjusted to insure approximately 50 percent less adhesive (50 percent decrease in roll speed) in sample 1, 25 percent less in sample 2, and 25 percent more in sample 4.

Sample 1 can best be described as having only light bonding between the outer fabric and intermediate fiberfill layers to the point that the layers are almost tacked together as described in U.S. Pat. No. 3,799,174 even after application of heat and pressure. Sample 2 has penetration of adhesive to approximately ⅓th the overall thickness of the intermediate layer on each pass, while sample 4 has penetration to approximately ⅔th the thickness of the intermediate layer on each pass after application of heat and pressure. Four separate two yerd sample rolls of 3 ply laminate were made as set forth above and then molded into bra cups as set forth below on conventional molding equipment.

Trial molding runs were made to establish the correct temperature, pressure and time for the application of the molds to roll 3 (control) material. It was established that the proper molding conditions to obtain a consistently a-propriate molded product from roll 3 were 330° F. at 120 pounds per square inch for 25 seconds. These conditions were left unchanged during the entire testing period.

Three samples from roll 3 were obtained, one at the beginning of the testing period, one during the period, and one at the close of the period. Each were inspected and deemed merchantable and therefore acceptable.

The other samples were rated as either acceptable (being of the same quality and merchantability as the samples numbered 3), unacceptable or marginal. Unacceptable means that a wrinkling occurred on the inner and outer layers creating a lack of uniformity in thickness in the cup. As such, the cup was insufficiently aesthetic and ran the risk of developing larger air pockets when a consumer applied normal washing techniques. This wrinkling or buckling was apparently the result of uneven adhesive distribution leaving areas unbonded. The term "marginal" was used in most cases where it would have been possible to utilize the product, however, greater experimentation would have been preferred to attain sample 3 quality.

Of three sample 1 products, none was found acceptable with one acceptable and two marginal.

Of four sample 2 products, one was found to be acceptable and three unacceptable.

Of three sample 3 products, all were found to be acceptable.

Of three sample 4 products, none was found acceptable with one unacceptable and two marginal.

It should be understood, of course, that the preferred laminate compositions of the present invention have adhesive penetration levels, after application of heat and pressure, that are between about ⅓ and ½ the overall thickness of the fiberfill layer, e.g., ⅓ to ½ the overall thickness on each side of the fiberfill layer. This is accomplished in two stages, the first being the application of adequate adhesive by reverse roll 15 to insure adhesive penetration in the fiberfill layer to levels at least between 1/20th and 1/10th the overall thcikness of the fiberfill layer, and the second being the application of heat and uniform pressure (with blanket 42, for example) to obtain the final desired adhesive penetration levels of ⅓ to ½ the overall thickness of the fiberfill layer.

Naturally, when insufficient amounts of adhesive are initially applied by reverse roll 15, then the subsequent adhesive penetration levels normally accomplished through the application of heat and uniform pressure cannot be achieved.

Although only three-layered laminates have been discussed and tested herein, it should be understood that multi-layered laminated products can be made from other materials than disclosed herein without departing from the spirit and scope of the present invention.

We claim:

1. A laminate composition suitable for molding into one-piece bra cups, comprising oppositely disposed outer fabric layers and an intermediate fiberfill layer of non-woven staple fibers disposed therebetween, said layers being held together with a separate and distinct adhesive composition which substantially penetrates said intermediate layer to securely bond said outer fabric layers to said intermediate fiberfill layer, said outer fabric layers and said intermediate fiberfill layer comprising fiber materials which shrink at approximately the same rate upon application of heat and pressure.

2. The laminate composition of claim 1 wherein said laminate composition is uniformly pre-shrunk prior to complete drying of said adhesive composition.

3. The laminate composition of claim 1 wherein said adhesive composition penetrates said intermediate layer to a depth of between about ⅓ and ½ the overall thickness of said intermediate layer on each side of said intermediate layer.

4. The laminate composition of claim 3 wherein said outer fabric layers comprise polyester fibers having deniers in the range of about 20 to 70, and said intermediate fiberfill layer comprises random, non-woven, staple polyester fibers having average fiber lengths in the range of about 1 to 2 inches.

5. The laminate composition of claim 1 wherein said adhesive composition is an aqueous dispersion or emulsion of a carboxylic acrylic polymer.

6. A molded bra cup made from the laminate composition of claim 1.

7. A laminate composition suitable for molding into one-piece bra cups, comprising a first outer fabric layer and an intermediate fiberfill layer of non-woven staple fibers secured to said outer fabric layer, said layers being held together with an adhesive composition which penetrates said intermediate layer to a depth of between about ⅓ and ½ the overall thickness of said intermediate layer, said outer fabric layer comprising polyester fibers having deniers in the range of about 20 to 70, and said intermediate fiberfill layer comprising random, non-woven, staple polyester fibers having average fiber lengths in the range of about 1 to 2 inches, whereby upon application of heat and pressure said fabric layer and fiberfill layer shrink at approximately the same rate.

8. A molded bra cup made from the laminate composition of claim 7 wherein a second outer fabric layer is secured to said intermediate fiberfill layer opposite said first outer fabric layer.

* * * * *